United States Patent [19]
Highsmith

[11] Patent Number: 5,476,167
[45] Date of Patent: Dec. 19, 1995

[54] ROLLER TRACK HAVING EXTERNALLY SECURED SPINDLES FOR STORAGE RACK, ROLLER CONVEYOR, OR SIMILAR APPARATUS

[75] Inventor: Charles E. Highsmith, Springfield, Tenn.

[73] Assignee: Unarco Material Handling, Inc., Springfield, Tenn.

[21] Appl. No.: 173,205

[22] Filed: Dec. 23, 1993

[51] Int. Cl.⁶ .................................................. B65G 13/00
[52] U.S. Cl. ................................... 193/35 R; 193/37
[58] Field of Search ................................ 193/37 35 R

[56] References Cited

U.S. PATENT DOCUMENTS

| | | | |
|---|---|---|---|
| 1,499,920 | 7/1924 | Godden | 193/37 |
| 1,580,367 | 4/1926 | Beulke | 193/37 |
| 1,943,998 | 1/1934 | Adams | 193/37 |
| 1,990,806 | 2/1935 | Watson et al. | 193/37 |
| 2,541,220 | 2/1951 | DuPerret | 193/37 |
| 2,607,459 | 8/1952 | Ludwig et al. | 193/37 |
| 2,687,792 | 8/1954 | Laugle, Sr. | 193/37 |
| 2,739,540 | 3/1956 | Woldring | 193/35 R |
| 2,740,513 | 4/1956 | Sullivan | 193/35 R |
| 2,887,203 | 5/1959 | Baron | 193/37 |
| 2,964,155 | 12/1960 | Flowers et al. | 193/35 R |
| 2,983,352 | 5/1961 | DeFlora et al. | 193/35 R |
| 3,081,857 | 3/1963 | Krueger | 193/35 R |
| 3,118,529 | 1/1964 | Rubner | 193/37 |
| 3,209,879 | 10/1965 | Wahl | 193/35 R |
| 3,252,556 | 1/1966 | Isacsson | 193/37 |
| 3,420,348 | 1/1969 | Caudell et al. | 193/35 R |
| 3,465,864 | 9/1969 | Lödige | 193/35 R |
| 3,586,142 | 6/1971 | Inwood et al. | 193/35 R |
| 3,621,960 | 11/1971 | Kornylak | 193/37 X |
| 3,721,326 | 3/1973 | Bussienne | 193/35 R |
| 3,869,031 | 3/1975 | Coleman et al. | 193/35 R |
| 3,900,112 | 8/1975 | Azzi et al. | 211/148 |
| 3,915,275 | 10/1975 | Specht | 193/35 R |
| 4,050,561 | 9/1977 | Seitz | 193/35 R |
| 4,054,195 | 10/1977 | Wahl | 193/35 R |
| 4,212,581 | 7/1980 | Pierce | 193/37 X |
| 4,681,203 | 7/1987 | Kornylak | 193/35 R |
| 4,765,493 | 8/1988 | Kinney | 193/35 R |
| 5,048,661 | 9/1991 | Toye | 193/35 R |
| 5,056,642 | 10/1991 | Highsmith | 193/37 X |

*Primary Examiner*—D. Glenn Dayoan
*Attorney, Agent, or Firm*—Dressler, Goldsmith, Shore & Milnamow, Ltd.

[57] ABSTRACT

A roller track for a storage rack arranged for gravitational flow of load-bearing pallets having two walls disposed in parallel relation to each other and a plurality of freely rotatable rollers journalled between the walls, each on a spindle, in such manner that the rollers extend upwardly from a space between the walls. Each wall has a separate aperture associated with a respective one of the rollers. Each roller is journalled on a spindle. Each end of the spindle has a shoulder portion larger than the associated aperture. Also, each end of the spindle has a pintle portion extending outwardly through the associated aperture, beyond the outer surface of the wall having the associated aperture. The roller track further has structures for securing at least some of the pintle portions to each wall where the secured pintle portions extend outwardly beyond the planes defined by the outer surfaces of such wall. These structures may have deformed ends of the secured pintle portions, welds between the pintle portions secured to each wall and the outer surface of such wall, or fasteners fastened to the secured pintle portions. Each fastener may be a snap ring seated in an annular groove in one of the secured pintle portions, a pin passing through an aperture in one of the secured pintle portions, or a locking end cap fitted over one of the secured pintle portions.

3 Claims, 1 Drawing Sheet

U.S. Patent  Dec. 19, 1995  5,476,167
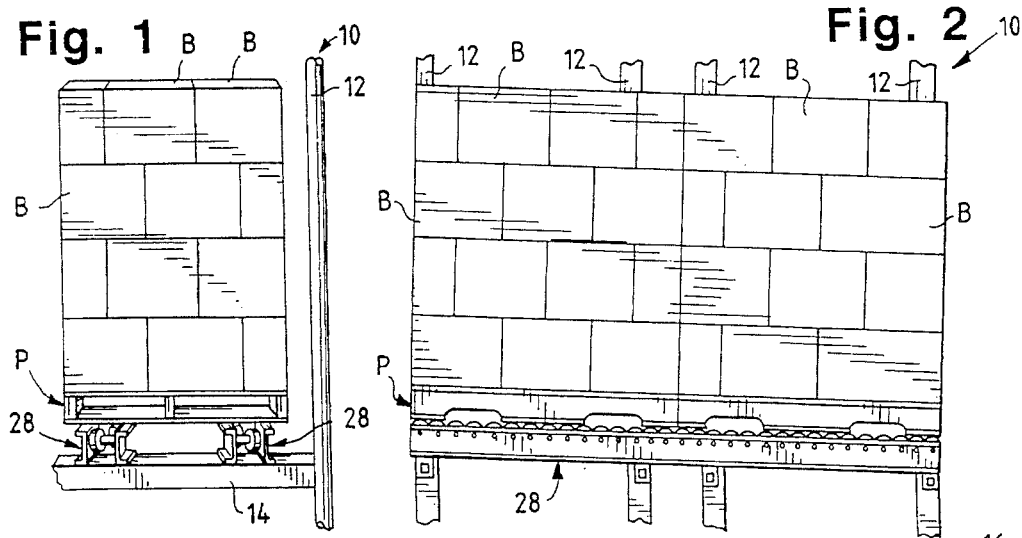
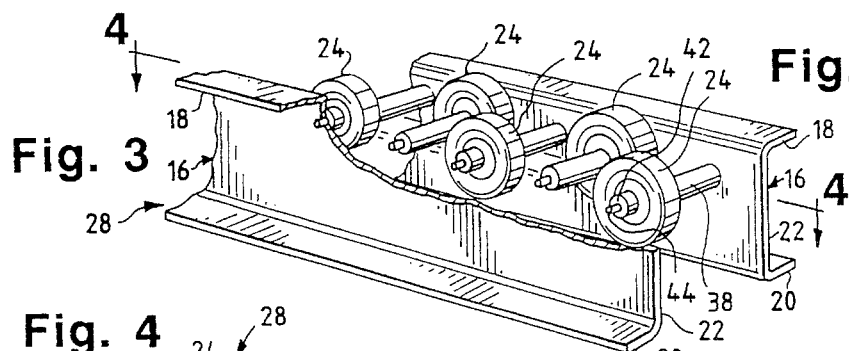
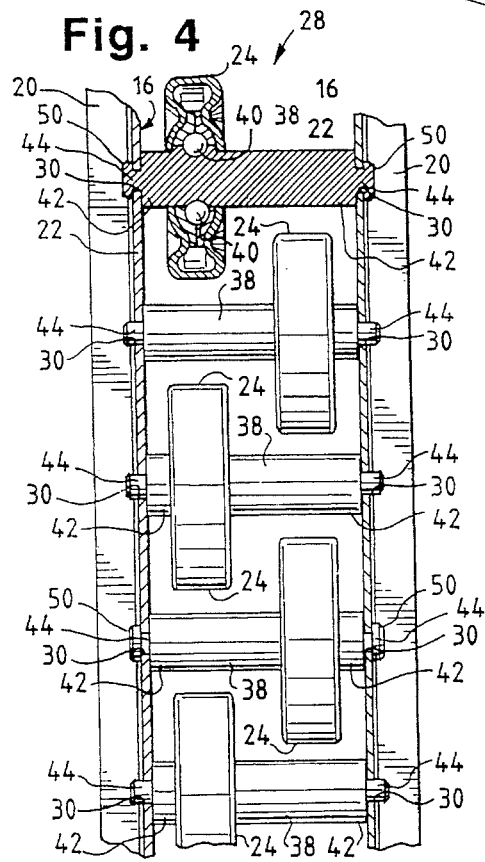
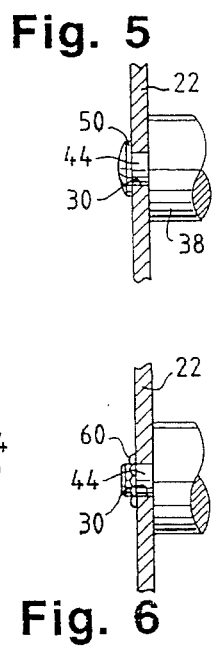
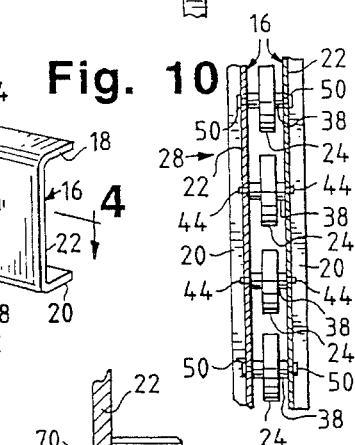
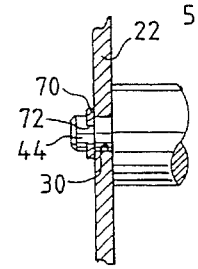
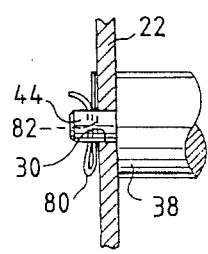
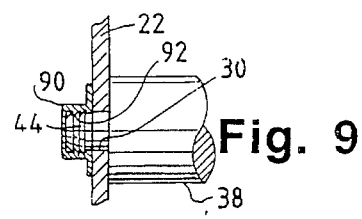

ROLLER TRACK HAVING EXTERNALLY
SECURED SPINDLES FOR STORAGE RACK,
ROLLER CONVEYOR, OR SIMILAR
APPARATUS

TECHNICAL FIELD OF THE INVENTION

This invention pertains to improvements in a roller track for a storage rack, roller conveyor, or similar apparatus.

BACKGROUND OF THE INVENTION

Typically, as used in a storage rack of a type arranged for gravitational flow of load-bearing pallets, a roller track comprises two walls, which are disposed in parallel relation to each other, and a plurality of freely rotatable rollers, which are journalled between the walls in such manner that the rollers extend upwardly from a space between the walls. Moreover, as used in such a storage rack, the roller track has a slight inclination (e.g. 3°) relative to a horizontal plane. Such storage racks are available commercially from Unarco Material Handling (a unit of UNR Industries, Inc.) of Chicago, Ill.

Such a roller track is disclosed in Highsmith U.S. Pat. No. 5,056,642. As disclosed therein, rollers of a first group are journalled on spindles bolted to the walls, and rollers of a second group are journalled on spindles held by but not bolted to the walls. Each of the bolted spindles has a tubular configuration fitting between the walls and accommodating a separate bolt. Each of the other spindles has a different configuration including, at each end, a shoulder portion larger than an aperture in one of the walls and a pintle portion fitted into the aperture.

Although the roller track disclosed in the Highsmith patent noted above permits simplified assembly, particularly as compared to prior roller tracks in which every spindle was bolted to the walls, spindles of two different configurations are employed in the roller track disclosed therein.

SUMMARY OF THE INVENTION

This invention provides, for a storage rack or roller conveyor, a roller track comprising two walls disposed in parallel relation to each other so as to define a space between the walls and a plurality of freely rotatable rollers journalled between the walls in such manner that the rollers extend upwardly from the space between the walls. In accordance with this invention, the walls and the rollers are assembled in an improved manner.

The walls have inner surfaces facing the space therebetween and outer surfaces. Each wall has a separate aperture associated with a respective one of the rollers. Each roller is journalled on a spindle. Each end of the spindle is associated with one of the apertures in one of the walls. Each end of the spindle has a shoulder portion, which is larger than the associated aperture, and a pintle portion, which extends outwardly through the associated aperture. Each pintle portion extends outwardly beyond the outer surface of the wall.

In accordance with this invention, the roller track further comprises means for securing at least some of the pintle portions to each wall where the secured pintle portions extend outwardly beyond the outer surfaces of such wall. The securing means may comprise deformed ends of the secured pintle portions. The securing means may comprise welds, which weld the pintle portions secured to each wall to the outer surface of such wall. The securing means may comprise fasteners, which are fastened to the secured pintle portions.

Fasteners of several known types may be alternatively employed. Each secured pintle portion may have be grooved where such secured pintle portion extends outwardly beyond the outer surface of one of the walls whereupon each fastener may comprise a snap ring seated where such secured pintle portion is grooved. Each fastener may comprise a pin passing through an aperture in one of the secured pintle portions. Each fastener may comprise a locking end cap fitted over one of the secured pintle portions.

These and other objects, features, and advantages of this invention are evident from the following description of several embodiments of this invention with reference to the accompanying drawings.

BRIEF DESCRIPTION OF THE DRAWINGS

FIG. 1 is a front view of one lane on one level of a storage rack arranged for gravitational flow of load-bearing pallets. Two roller tracks, which embody this invention, are shown with such a pallet on the roller tracks.

FIG. 2 is a side view of subject matter shown in FIG. 1. Two such pallets are shown in the lane.

FIG. 3 is an enlarged, fragmentary, perspective view of two walls and several rollers in a staggered arrangement contemplated by this invention, before assembly of one roller track has been completed.

FIG. 4 is a sectional view taken along line 4—4 of FIG. 3, in a direction indicated by arrows, after assembly of the roller track has been completed.

FIGS. 5 through 9 are fragmentary details showing alternative means for securing the spindles of selected rollers to the walls during assembly of the roller track.

FIG. 10, on a smaller scale compared to FIGS. 3 through 9, is a sectional view analogous to FIG. 4 but showing two walls and four rollers in an aligned arrangement contemplated by this invention.

DETAILED DESCRIPTION OF ILLUSTRATED
EMBODIMENTS

As shown in FIGS. 1 and 2, a storage rack 10 constituting a preferred embodiment of this invention is arranged for gravitational flow of pallets P bearing loads of stacked boxes B. The storage rack 10 is similar to storage racks known heretofore in being a bolted or welded structure comprising structural steel members. A bolted structure is preferred. These members include upright members 12, transverse members 14, and longitudinal members 16. Each longitudinal member 16 has a slight inclination (e.g. 3°) relative to a horizontal plane.

Each longitudinal member 16 has an upper flange 18 extending in a lateral direction, a lower flange 20 extending in the same direction, and a vertical wall 22 extending between the flanges 18, 20. The longitudinal members 16 are arranged in pairs, in which the flanges 18, 20, of the respective members 16 extend oppositely, and in which the walls 22 of the respective members 16 are disposed in parallel relation to each other.

The longitudinal members 16 of each pair are assembled with a longitudinal array of steel rollers 24 in two staggered rows, as shown in FIGS. 1, 3, and 4, or in one aligned row, as shown in FIG. 10, to provide a roller track 28. In the roller track 28, the rollers 24 are journalled between the walls 22 so as to be freely rotatable. Moreover, the rollers 24 are journalled in such manner that the rollers 24 extend upwardly from a space between the walls 22. Because of the slight inclination of each longitudinal member 16, the roller track 28 has a similar inclination (e.g. 3°) relative to a horizontal plane.

The roller tracks 28 are arranged in pairs. Each pair of the roller tracks 28 is used to support pallets, such as the pallets P, in one lane on one level of the storage rack 10. According to conventional practice, the storage rack 10 may have multiple lanes on multiple levels.

At its lower end, each roller track 28 comprises a stop (not shown) which is mounted between the longitudinal members 16. The stop limits gravitational flow of the pallets, such as the pallets P, along such roller track 28. A preferred stop is disclosed in Klein U.S. Pat. No. 5,033,600.

Near the upper flange 18 of each longitudinal member 16, the wall 22 of such longitudinal member 16 has a longitudinal array of regularly spaced, circular apertures 30, which extend through the wall 22. In the longitudinal members 16 of each pair, the apertures 30 are arranged in pairs. Each pair of the apertures 30 is associated with one of the rollers 24. Each pair of the apertures 30 includes one aperture in each longitudinal member 16 and the apertures 30 of each pair are aligned with each other. Because the apertures 30 are circular, each aperture 30 has a continuous margin and has rotational symmetry about an axis of such aperture 30.

Each roller 24 has a steel spindle 38 and ball bearings 40 enabling such roller 24 to rotate freely on the spindle 38. Such bearings 40 are mounted operatively in a known manner.

The spindle 38 of each roller 24 has rotational symmetry about an axis of the spindle 38 and is provided at each end with a shoulder portion 42 and a pintle portion 44. The shoulder portion 42 is larger than the apertures 30 and bears against the continuous margin of one of the apertures 30 associated with such roller 24. The pintle portion 44 has a cylindrical surface conforming to the same aperture 30 and is fitted into the same aperture 30. As shown in FIG. 4, the pintle portion 44 extends outwardly through such aperture 30, beyond the outer surface of the wall 22 having such aperture 30. Although it is preferred for the pintle portion 44 to be press-fitted into such aperture 30, the pintle portion 44 may be freely rotatable within such aperture 30.

In the staggered arrangement of FIGS. 1, 3, and 4, the rollers 24 are arranged in two staggered rows, in which the rollers 24 are disposed asymmetrically between the opposite ends of the spindles 38. In the staggered rows, the rollers 24 are alternated so that every other roller 24 is nearer to one wall 22 and so that the other rollers 24 are nearer to the other wall 22. In the aligned arrangement of FIG. 10, in which the rollers 24 are aligned in one row, the rollers 24 are disposed symmetrically between the opposite ends of the spindles 38.

In the aligned arrangement, as compared to the staggered arrangement, the rollers 24 must be longitudinally spaced from one another. In the staggered arrangement, as compared to the aligned arrangement, a unit length of the roller track 28 can include more rollers 24 so as to provide more areas of contact with a supported pallet.

The rollers 24 are divided into two groups, namely a first group wherein the rollers 24 are secured to the walls 22 and a second group wherein the rollers 24 are not secured to the walls 22. As compared to the rollers disclosed in Highsmith U.S. Pat. No. 5,056,642, which rollers have spindles of two different configurations, the rollers 24 are made with similar spindles 38. In an alternative arrangement (not shown) all of the rollers 24 are secured to the walls 22.

Along at least a substantial portion of each roller track 28, and preferably along its entire length except possibly at either end or at both ends, the rollers 24 are arranged in a repeating pattern wherein every nth roller 24 is a roller of the first group while every remaining roller 24 is a roller 24 of the second group. Herein, n is a whole number greater than one, preferably three or four. As shown, n is three.

In the staggered arrangement of FIGS. 1, 3, and 4, and in the aligned arrangement of FIG. 8, each roller track 28 comprises means for securing the pintle portions 44 of the spindles 38 of the rollers 24 of the first group to the walls 22. In the alternative arrangement noted above, wherein all of the rollers 24 are secured to the walls 22, each roller track 28 comprises means for securing the pintle portions 44 of the spindles 38 of all of the rollers 24 of such roller track 28 to the walls 22.

In each such arrangement, the outer surface of each wall 22 defines a plane. Furthermore, such means secure the secured pintle portions 44 to the walls 22 where the secured pintle portions 44 extend outwardly through the associated apertures 30, beyond the planes defined by the outer surfaces of the walls 22.

As shown in FIG. 5, and also in FIGS. 3 and 10, the securing means may comprise deformed ends 50 of the secured pintle portions 44. As shown therein, the ends 50 of the pintle portions 44 to be so secured are deformed so that the deformed ends 50 bear against the outer surfaces of the walls 22, at the outer margins of the associated apertures 30, while the shoulder portions 42 of the same spindles 38 bear against the inner surfaces of the walls 22, at the inner margins of the associated apertures 30. The ends 50 of the pintle portions 44 to be so secured may be so deformed by swaging or peening, by deforming such ends 50 simultaneously in a press, or otherwise.

As shown in FIG. 6, each securing means may comprise a fillet weld 60, which welds a secured pintle portion 44 to the outer surface of one of the walls 22, at and around the outer margin of the associated aperture 30.

As shown in FIGS. 7, 8, and 9, the securing means may comprise fasteners, which are fastened to the secured pintle portions 44 where the secured pintle portions 44 extend outwardly through the associated apertures 30, beyond the planes defined by the outer surfaces of the walls 22. Fasteners of known types may be used, as described below.

As shown in FIG. 7, each fastener may be a snap ring 70 seated in an annular groove 72 in a secured pintle portion 44 where the secured pintle portion 44 extends outwardly through the associated aperture 30, beyond the plane defined by the outer surface of the wall 22 having the associated aperture 30. So as to allow all of the rollers 24 to have one spindle configuration, any pintle portions 44 that are not secured to the walls 22 may have similar grooves 72, which are not used.

As shown in FIG. 8, each fastener may comprise a cotter pin 80 made of bent steel wire and passing through an aperture 82 in a secured pintle portion 44 where the secured pintle portion 44 extends outwardly through the associated aperture 30, beyond the plane defined by the outer surface of the wall 22 having the associated aperture 30. The aperture 82 extends diametrically through the axis of the spindle 38 having the pintle portion 44 secured by the cotter pin 80. So as to allow all of the rollers 24 to have one spindle configuration, any pintle portions 44 that are not secured to the walls 22 may have similar apertures 82, which are not used.

As shown in FIG. 9, each fastener may comprise a locking end cap 90, which is fitted over a secured pintle portion 44 where the secured pintle portion 44 extends outwardly through the associated aperture 30, beyond the outer surface of the wall 22 having the associated aperture 30. The locking end cap 90 has internal barbs 92, which are shaped so as to permit the locking end cap 90 to be easily pressed onto the secured pintle portion 44 but so as to impede its removal from the secured pintle portion 44.

This invention contemplates other embodiments (not shown) in which some spindles are bolted to the walls, as disclosed in Highsmith U.S. Pat. No. 5,056,642, and other embodiments (not shown) in which some spindles have fixed rollers but are mounted rotatably to the walls.

Various modifications may be made in the illustrated and described embodiments without departing from the scope and spirit of this invention.

I claim:

1. For a storage rack or roller conveyor, a roller track comprising two walls disposed in parallel relation to each other so as to define a space between the walls and a plurality of freely rotatable rollers journalled between the walls in such manner that the rollers extend upwardly from the space between the walls, the walls having inner surfaces facing the space therebetween and outer surfaces, each wall having a separate aperture associated with a respective one of the rollers, the respective apertures being similar in both walls, each roller having a spindle with two ends, each end being associated with one of the apertures in one of the walls, wherein at least some of the spindles are secured permanently to the walls by extending the ends thereof through the associated apertures and deforming the ends thereof near the outer surface of the walls after the ends thereof have been extending through the associated apertures, wherein each of end of each spindle has a shoulder portion larger than the associated aperture and a pintle portion extending through the associated aperture and wherein the pintle portions of at least some of the spindles are deformed where the pintle portions extend beyond the associated apertures.

2. The roller track of claim 1 wherein the deformed portions are swaged.

3. The roller track of claim 1 wherein the deformed portions are peened.

* * * * *

UNITED STATES PATENT AND TRADEMARK OFFICE
CERTIFICATE OF CORRECTION

PATENT NO. : 5,476,167

DATED : December 19, 1995

INVENTOR(S) : Charles E. Highsmith

It is certified that error appears in the above-indentified patent and that said Letters Patent is hereby corrected as shown below:

Claim 1, column 6, line 11, "extending" should be --extended--; and

Column 6, line 11, at the end of the line, "of" should be deleted.

Signed and Sealed this

Twenty-ninth Day of October 1996

Attest:

BRUCE LEHMAN

*Attesting Officer*   *Commissioner of Patents and Trademarks*